(12) United States Patent
Keller et al.

(10) Patent No.: US 7,097,391 B1
(45) Date of Patent: Aug. 29, 2006

(54) PNEUMATIC CARRIER

(75) Inventors: Danny D. Keller, Sanger, TX (US); Steven K. Ettelson, Hollis, NH (US)

(73) Assignee: Vaupell Molding & Tooling, Inc., Seattle, WA (US)

( * ) Notice: Subject to any disclaimer, the term of this patent is extended or adjusted under 35 U.S.C. 154(b) by 0 days.

(21) Appl. No.: 10/821,488

(22) Filed: Apr. 9, 2004

(51) Int. Cl.
   *B65G 51/06* (2006.01)
(52) U.S. Cl. .................................................. 406/186
(58) Field of Classification Search ............... 406/186
   See application file for complete search history.

(56) References Cited

U.S. PATENT DOCUMENTS

| | | | |
|---|---|---|---|
| 431,900 A | 7/1890 | Leake | 406/185 |
| 658,343 A | 9/1900 | Clark | 220/324 |
| 726,022 A | 4/1903 | Burton | 406/186 |
| 1,751,079 A | 3/1930 | Drumm | 292/101 |
| 2,969,891 A | 1/1961 | Presnick | 220/73 |
| 3,072,280 A | 1/1963 | Spadaro | 220/4 |
| 3,072,362 A | 1/1963 | Allen | 243/35 |
| 3,088,623 A | 5/1963 | Parker | 220/46 |
| 3,507,417 A | 4/1970 | McCarthy | 220/5 |
| 3,531,015 A | 9/1970 | Makin | 206/65 |
| 3,593,948 A | 7/1971 | McClellan | 243/34 |
| 3,612,438 A | 10/1971 | Herndon | 243/19 |
| 3,825,210 A | 7/1974 | Weaver | 243/34 |
| 3,957,171 A | 5/1976 | Besser | 220/71 |
| 4,006,868 A | 2/1977 | Hochradel et al. | 243/34 |
| 4,095,719 A | 6/1978 | Wolf | 220/4 |
| 4,149,685 A | 4/1979 | Leavelle | 243/34 |
| 4,256,418 A * | 3/1981 | Stangl | 406/112 |
| 4,460,105 A | 7/1984 | Cox | 220/335 |
| 4,465,410 A | 8/1984 | Vogel et al. | 406/111 |
| 4,546,874 A | 10/1985 | Kirchhan | 220/4 |
| 4,802,571 A * | 2/1989 | Born et al. | 198/626.1 |
| 4,905,857 A | 3/1990 | Her | 220/4 |
| 4,938,360 A | 7/1990 | Wallace | 206/586 |
| 4,948,303 A * | 8/1990 | Good | 406/186 |
| 4,971,201 A | 11/1990 | Sathre | 206/509 |
| 4,993,585 A | 2/1991 | McMahon | 220/643 |
| 5,053,196 A * | 10/1991 | Ide et al. | 422/28 |
| 5,427,265 A | 6/1995 | Cautereels et al. | 220/318 |
| 5,472,110 A | 12/1995 | Boyd et al. | 220/326 |
| 5,549,421 A * | 8/1996 | Reinhardt et al. | 406/3 |
| 5,573,356 A * | 11/1996 | Henderson | 406/186 |
| 5,636,947 A | 6/1997 | Valerino, Sr. et al. | 406/186 |
| 5,655,677 A | 8/1997 | Fratello et al. | 220/4.22 |
| 5,682,910 A | 11/1997 | Kizawa et al. | 132/293 |
| 5,871,305 A * | 2/1999 | Allen | 405/70 |
| 5,887,736 A | 3/1999 | Mar | 215/213 |
| 5,980,164 A | 11/1999 | Fratello | 406/190 |
| 6,173,212 B1 * | 1/2001 | Valerino, Sr. | 700/218 |

(Continued)

FOREIGN PATENT DOCUMENTS

| | | | |
|---|---|---|---|
| CA | 955910 | 10/1974 | 406/186 |
| DE | 1133314 | 7/1962 | 406/186 |
| DE | 4111492 | 10/1992 | 406/188 |
| DE | 4111494 | 10/1992 | 406/190 |

*Primary Examiner*—Joe Dillon, Jr.
(74) *Attorney, Agent, or Firm*—Thompson & Gustavson, L.L.P.

(57) ABSTRACT

A fluid-tight carrier (10) is disclosed which has main latches (34 and 36). Each main latch has a safety latch (70) which secures the main latches within the latched position until an operator deflects the safety latch (70) away from the slidable catch (42) to permit the main latch to be moved to the unlatched position. This prevents inadvertent opening of the carrier due to impact on the carrier. The carrier can be formed of anti-microbial material, have removable wear strips and includes an ergonomic design.

4 Claims, 3 Drawing Sheets

U.S. PATENT DOCUMENTS 6,477,442 B1 * 11/2002 Valerino, Sr. ............... 700/213
6,506,428 B1 * 1/2003 Berge et al. ................. 426/66
6,626,469 B1 * 9/2003 Favre et al. ................. 285/249

* cited by examiner

PNEUMATIC CARRIER

BACKGROUND OF THE INVENTION

The transportation of items through pneumatic tubes is well known. Recently, a need has arisen to transport medical samples and other hazardous material within such carriers. For safety purposes, it has been desirable to seal the interior of the carrier from the outside in the event that a sample spills or leaks within the carrier. Examples of such designs are illustrated in U.S. Pat. No. 5,636,947 to Valerino Sr. et al and U.S. Pat. No. 5,655,677 to Fratello et al.

Typically, such designs use some type of a seal which is compressed when the carrier is closed to provide isolation. Normally, a latch of some type is used to hold the carrier in the closed position. However, a latch can be caught by sharp corners in a pneumatic tube, or sprung by sudden impacts or violent motion within the tube. If the latch opens, the seal of the carrier is jeopardized. A need exists for a design which preserves the integrity of the seal during the rough handling that such carriers often experience. Other critical applications for latches also exist, such as on luggage transported by airplane, etc, where the luggage is subject to severe handling, and the unintentional opening of a latch can lead to loss of the contents, etc.

SUMMARY OF THE INVENTION

In accordance with one aspect of the present invention, a carrier is provided which has a first half and a second half hinged together to permit the first and second halves to move between an open position and a closed position. At least one main latch is movable between a latched position and an unlatched position to hold the first and second halves in the closed position when the latch is in the latched position. The main latch includes a stationary portion secured to the first half, with the stationary portion defining a guide. A movable portion is mounted to the stationary portion for sliding motion between a first limit and a second limit. A cam is mounted on the second half. The movable portion engages the cam to move the first and second halves into the closed position as the movable portion is moved toward the first limit. A resilient safety latch is mounted on the stationary portion to engage the movable portion when the first and second halves are in the closed position to secure the latch in the latched position. The safety latch also has a knob forming a finger contact portion to allow the safety latch to be moved away from the movable portion to release the main latch.

In accordance with another aspect of the present invention, the movable portion has an aperture to receive a portion of the safety latch when the main latch is in the latched position. The safety latch can be molded integrally with the stationary portion. The cam can be integrally molded in the second half. Two main latches can be provided, with a cam integrally molded in each half so that the first and second halves can be identical.

In accordance with another aspect of the present invention, the carrier can include a wear band, the wear band including a seal material and a flexible backing strip. The first and second halves include a channel to slidably receive the backing strip to secure the wear band on the first and second halves.

In accordance with another aspect of the present invention, the first and second halves are formed of anti-microbial material.

In accordance with another aspect of the present invention, the carrier includes an ergonomic design.

BRIEF DESCRIPTION OF THE DRAWINGS

For a more complete understanding of the present invention and the advantages thereof, reference is now made to the following Detailed Description taken in conjunction with the accompanying Drawings, in which.

DETAILED DESCRIPTION OF THE INVENTION

Figure 1:
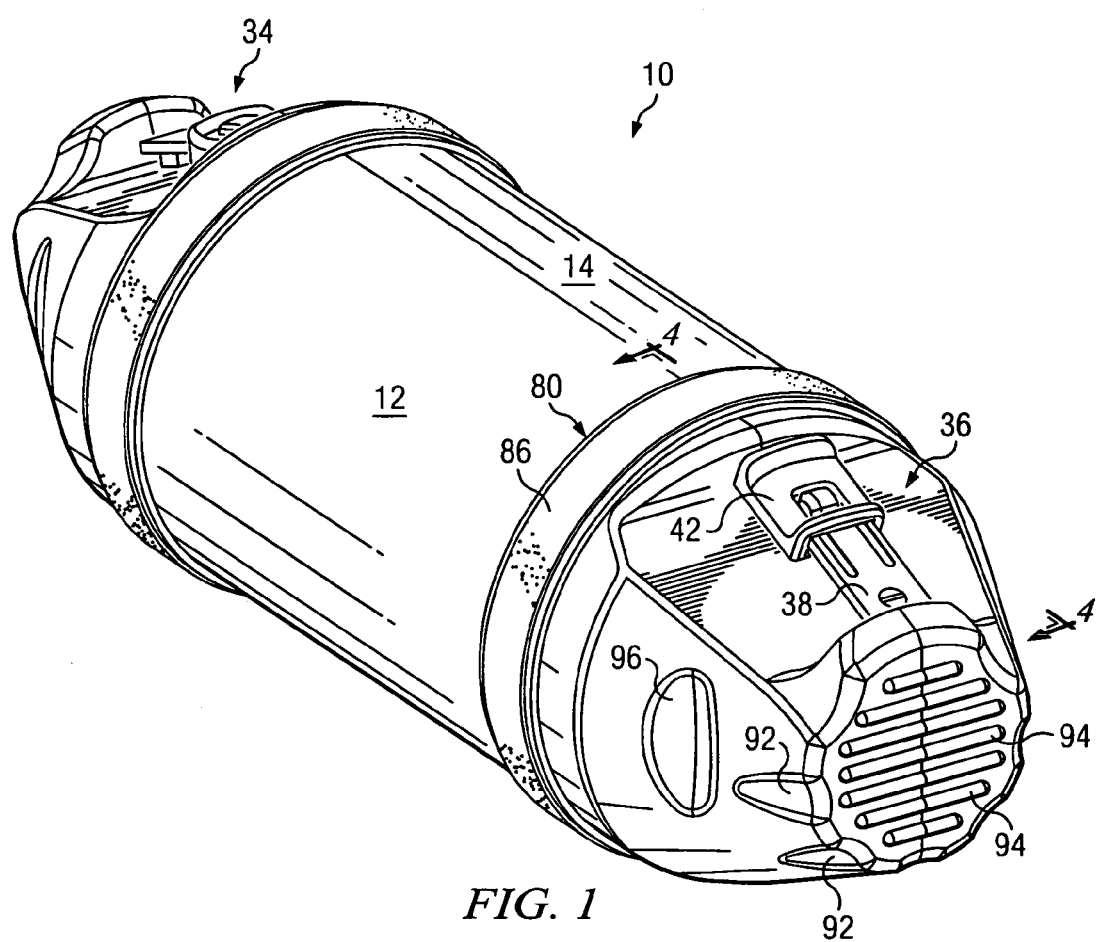
FIG. 1 is a perspective view of a carrier incorporating a first embodiment of the present invention in the closed position.

With reference now to the accompanying drawings, wherein like or corresponding parts are designated by the same reference numerals, there is illustrated a carrier 10 of the type used to carry items therein in a pneumatic tube system. The carrier 10 can carry medical samples, letters, objects, and the like. The carrier 10 includes a first half 12 and a second half 14. The first half has first hinge elements 16 while the second half has second hinge elements 18 which, along with a hinge pin 20, form a hinge 22, as seen in FIG. 2, to allow the halves of the carrier 10 to be moved between an open position, seen in FIG. 2, to insert or remove the item to be carried, and the closed position, seen in FIG. 1, ready for transportation through a pneumatic tube.

Figure 2:
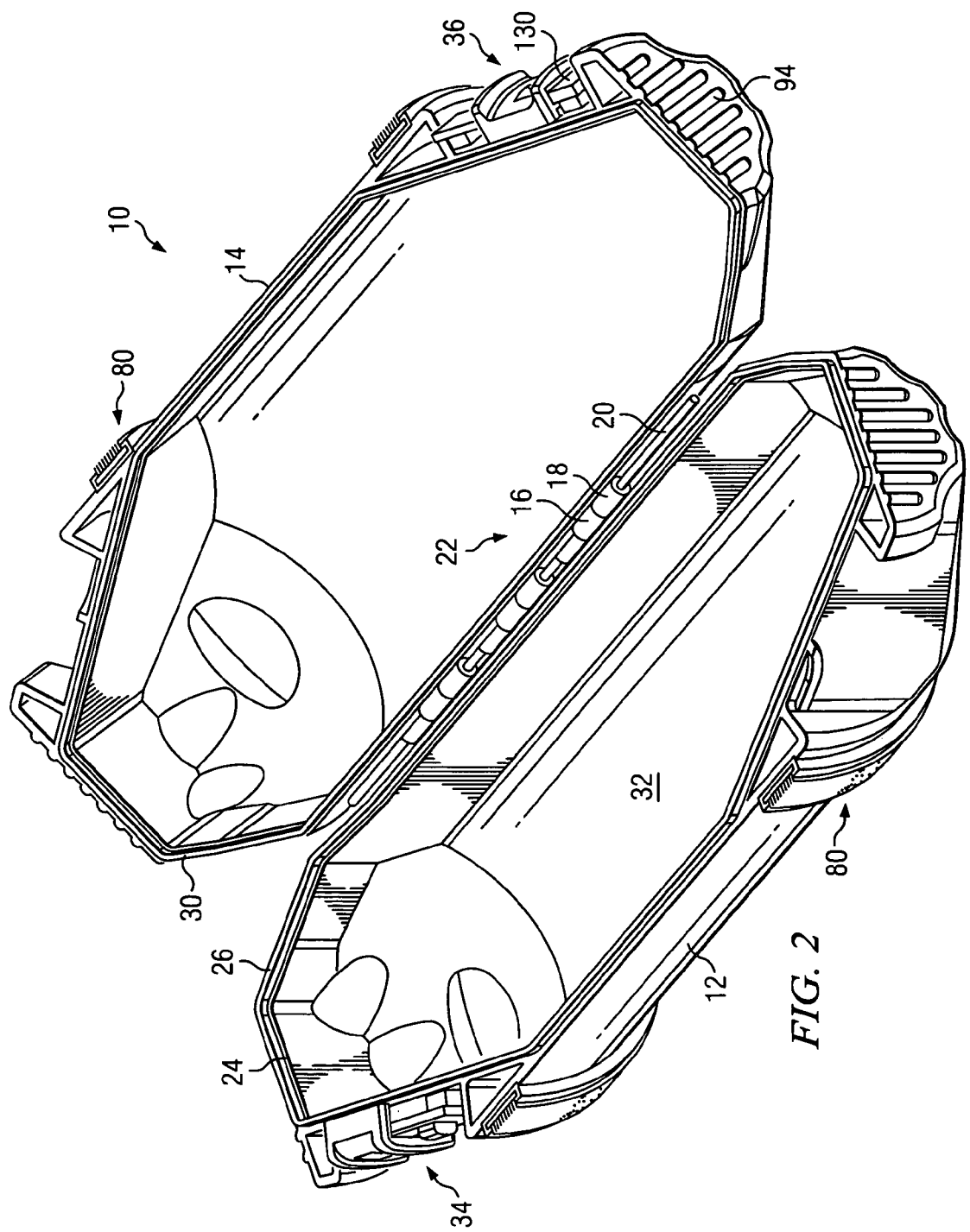
FIG. 2 is a perspective view of a carrier incorporating a first embodiment of the present invention in the open position.

As best seen in FIG. 2, the first half 12 has a continuous peripheral groove 24 formed in edge surface 26 which receives an O-ring (not shown). The second half 14 has a continuous raised ridge 30 which, when the carrier 10 is in the closed position, as seen in FIG. 1, is compressed against the O-ring to form a continuous seal to isolate the interior 32 of the carrier from exterior of the carrier. Alternatively, both halves can have a groove 24, with the O-ring sealing between the grooves when the carrier 10 is in the closed position, allowing the first and second halves 12 and 14 to be identical. Thus, the carrier can safely carry hazardous materials, such as medical and biological fluid samples. Designs of this general type are disclosed in U.S. Pat. Nos. 5,636,947 and 5,655,677, the disclosures of which are hereby incorporated by reference in their entirety herein.

Figure 3:
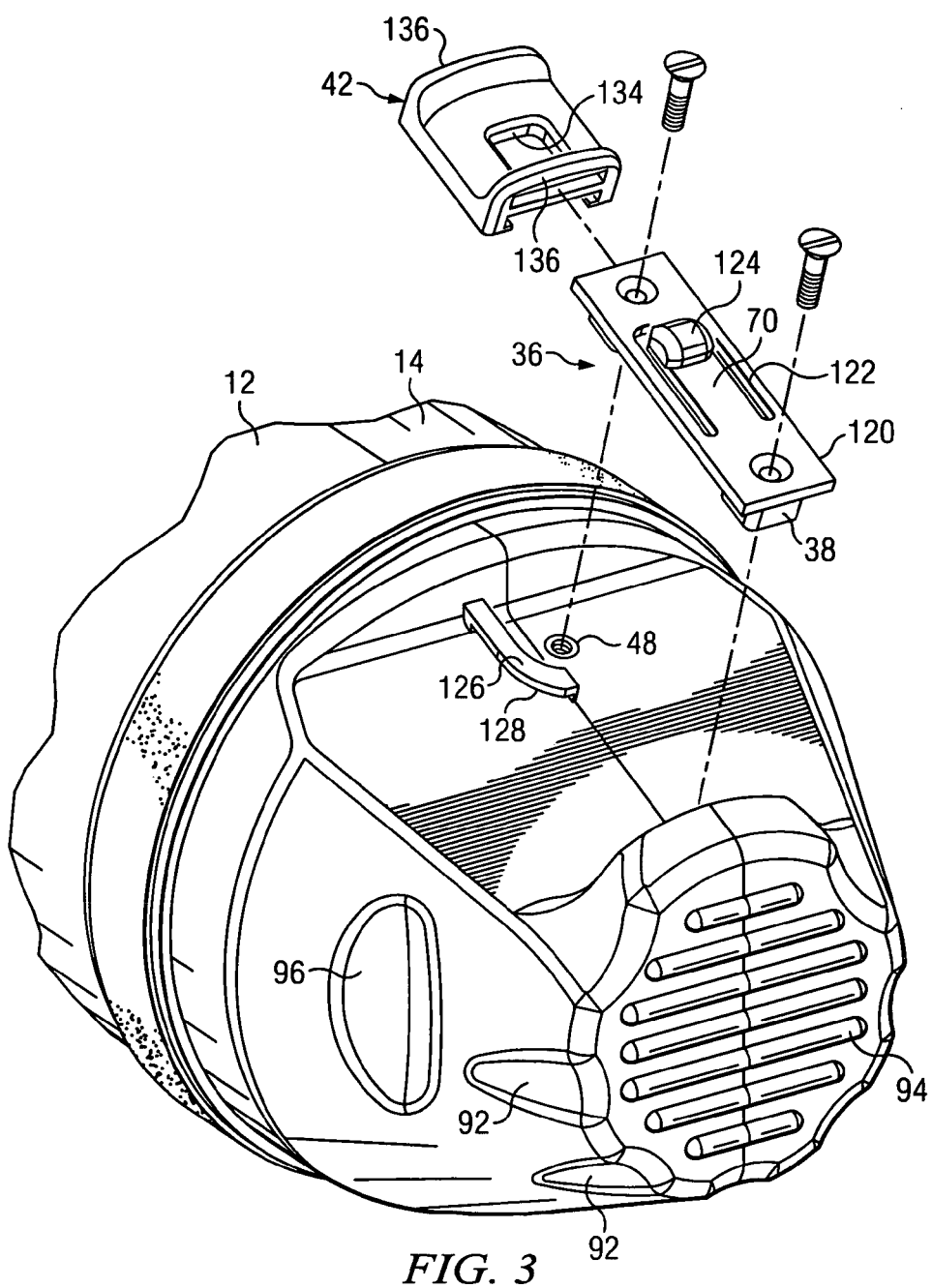
FIG. 3 is an exploded view of the main latch on the carrier.

To hold the carrier 10 in the closed position, two main latches 34 and 36 are employed. As best seen in FIG. 3, each main latch includes a base 38 secured to one of the halves 14 and 16, preferably by screws threaded into threaded inserts 48 molded into the halves 14 and 16. The base 38 includes a portion forming slide 120 which extends the length of the base 38, and a safety latch 70. The safety latch 70 is cantilevered from the remainder of the base 38 by forming the base 38 with opening 122 surrounding three sides of the safety latch 70, leaving only one side integral with the remainder of the base 38. This allows the safety latch 70 to be deflected relative the rest of the base 38 as will be described hereinafter. The safety latch 70 includes a raised knob 124 at the free end of the safety latch 70.

A slidable catch 42 is secured to the base 38 so that the catch 42 can slide the length of the base 38 along the slide 120. A cam 126 is molded into the halves 12 and 14 immediately opposite the position of base 38 on the mating half. When the halves 12 and 14 are in the closed position, catch 42 can be slid along slide 120 from the open position 130 at the outer end of the slide to engage the cam 126 on the mating half. As the catch 42 continues to be slid along slide 120, the catch 42 will travel along the curved surface 128 of the cam 126 to draw the halves into ever tighter engagement. As catch 42 is slid from the open position 130, the catch 42 slides over the knob 124 on the safety latch 70, causing the safety latch 70 to deflect underneath the catch 42 and permit the catch 42 to move along the slide 120. As the catch 42 moves into the latched position, the knob 124 is aligned with aperture 134 in the catch 42 and the safety latch 70 rebounds, with the knob 124 popping up into the aperture 134 to hold the catch 42 in the latched position. The knob 124 and safety latch 70 will lock the catch 42 in the latched position until an operator depresses the knob 124 out of the aperture, allowing the catch 42 to then be slid to the unlatched position. It is very unlikely the knob 124 will be depressed inadvertently as it lies below the level of the upturned ends 136 of the catch 42, as seen in FIG. 3. Also, the main latches 34 and 36 do not have elements that pop up or pivot outwardly as they become unlatched, avoiding the possibility of these elements being sheared off or otherwise damaged as the carrier is used.

As is well understood, the main latch 34 or 36 can be moved from a latched position, where the catch 42 tightly engages the cam 126 to hold the carrier 10 in the closed position, to an unlatched position, permitting the catch 42 to be disengaged from the cam 126 to allow the carrier 10 to be opened. As can be seen, the halves 12 and 14 can be mirror images of each other, with one end of each half having a cam 126 and the other end mounting base 38, allowing a single mold to be used to make both halves.

Preferably, the first and second halves 12 and 14, base 38, catch 42 and safety latch 70 are molded and formed of polycarbonate, ABS, nylon, such a PA66 or PA6 nylon, or any suitable engineered plastic. Alternatively, the base 38, catch 42 and safety latch 70 can be formed of a flexible metal, such as steel.

Another advantage of the carrier 10 is the wear bands 80. Wear bands 80 reduce damage to the carrier as the carrier is driven through the pneumatic tubes and also provides a seal between the carrier and the inner walls of the tubes to reduce air leakage past the carrier that would reduce the driving force of the pressurized air behind the carrier. As can be appreciated, these wear bands are subject to considerable abuse and require frequent replacement.

Figure 4:
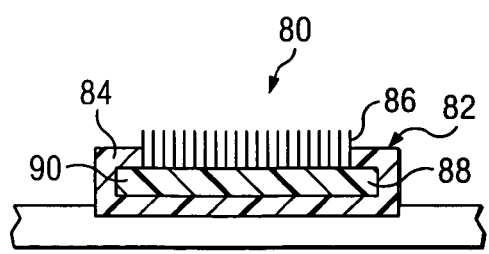
FIG. 4 is a cross sectional view illustrating the wear band.

Wear bands 80 are designed to simplify and shorten the replacement process. A channel 82 is secured at each end of halves 12 and 14. Channel 82 includes upturned edges 84 as seen in FIG. 4. The wear bands 80 are formed of a flexible contact material 86 and a backing 88 having edges 90. The contact material 86 can be carpeting or fabric material as used in a Velcro system. The backing 88 is sufficiently rigid to be slid into a channel 82 from one end of the channel 82, until the backing 88 completely fills the channel 82, with the edges 90 of the backing 88 engaging the edges 84 of the channel. The channel 82 can be separate from the halves 12 and 14 and attached to the halves by any suitable technique, such a gluing, riveting, etc. or the channel 82 can be actually molded into the halves 12 and 14 and thus be integral therewith.

The hinge elements 16 and 18 prevent the backing 88 from entering or exiting the channel 82 from the hinge side of the halves 12 and 14 so that the wear bands 80 can only be removed or installed from the other side of the halves.

When the carrier 10 is in the closed position, the wear bands 80 on the mating halves also move into mating relationship, preventing the wear bands 80 from sliding out of the channels 82 during use. When a wear band 80 must be replaced, it is necessary only to open the carrier and slide the wear band 80 to be replaced from its channel 82. The new wear band 80 is installed by simply sliding the new band 80 into the channel 82.

The carrier 10 is made easier to grasp and manipulate by forming recesses 92 at each end of the carrier. Seven are shown at each end in the Figures. Also, ribs 94 can be formed at the ends of the carrier and slots 96 on the sides of the carrier to allow the carrier 10 to be more readily grasped.

The carrier 10 can be color coded to facilitate use. For example, if carriers 10 are used in a hospital, carriers used in the emergency room can be red, carriers used in the X-ray department can be green, carriers used in billing can be blue, carriers used in the maternity ward can be purple, etc. With color coding, it will be immediately apparent where the carrier is coming from or going to.

Another advantage of the carrier 10 is the use of an anti-microbial material, such as anti-microbial plastics, to form the first and second halves 12 and 14. Anti-microbial plastics can be formed by molding into the plastic particles of glass containing anti-microbial metal ions such as silver (Ag). Such treated glass is sold by Ishizuka Glass Co., Ltd. of Nagoya, Japan. An anti-microbial material can be used in any style of carrier, such as a carrier that is not leak resistant. For example, anti-microbial material can be used in all hospital and bank carrier products.

While the main latches 34 and 36 are described above in use with a carrier 10, the latches can be used in many other applications. For example, main latches 34 and 36 can be used as the latches on a suitcase or briefcase. Both suitcases and briefcases are often subject to abuse, particularly if placed in the cargo hold of an aircraft. Also, materials carried in such cases, for example important business documents in a briefcase, may be so sensitive and valuable as to justify the added security in using main latches 34 and 36 to prevent an unintentional opening of the case. Other uses of latches 34 and 36 can be on equipment cases, ballot boxes, drawers, etc.

Although several embodiments of the invention have been illustrated in the accompanying drawings and described in the foregoing detailed description, it will be understood that the invention is not limited to the embodiments disclosed, but is capable of numerous rearrangements, modifications and substitutions of parts and elements without departing from the spirit and scope of the invention.

The invention claimed is:

1. A carrier for carrying an object within an interior of the carrier, the carrier comprising:
    a first half;
    a second half;
    the first and second halves hinged together to permit the first and second halves to move between an open position and a closed position, the first and second halves being formed of a anti-microbial material and wherein the first half has a first hinge element and the second half has a second hinge element;
    the first and second hinge elements mating to form a hinge to permit the first and second halves to move between an open position and a closed position;
    at least one main latch movable between a latched position and an unlatched position to hold the first and second halves in a closed position in the latched position of said at least one main latch, said main latch including a stationary portion secured to the first half, said stationary portion defining a guide, a movable portion mounted to the stationary portion for sliding motion between a first limit and a second limit, and a cam mounted to the second half, the movable portion engaging the cam to move the first and second halves into the closed position as the movable portion is moved toward the first limit; and a safety latch to hold the main latch in the latched position, wherein said safety latch is formed with a knob to engage the movable portion when the movable portion is in the latched position, the safety latch sufficiently flexible so that contact with the knob permits deflection of the safety latch away from the movable portion to permit the movable portion to be moved to the unlatched position.

2. A carrier for carrying an object within an interior of the carrier, the carrier comprising:

a first half;

a second half;

the first and second halves hinged together to permit the first and second halves to move between an open position and a closed position, the first and second halves being formed of a anti-microbial material and wherein the first half has a first hinge element and the second half has a second hinge element;

the first and second hinge elements mating to form a hinge to permit the first and second halves to move between an open position and a closed position;

at least one main latch movable between a latched position and an unlatched position to hold the first and second halves in a closed position in the latched position of said at least one main latch, said main latch including a stationary portion secured to the first half, said stationary portion defining a guide, a movable portion mounted to the stationary portion for sliding motion between a first limit and a second limit, and a cam mounted to the second half, the movable portion engaging the cam to move the first and second halves into the closed position as the movable portion is moved toward the first limit; and a safety latch to hold the main latch in the latched position wherein the safety latch is formed integrally with the stationary portion.

3. A carrier of claim 1 wherein the movable portion has an opening therethrough, the knob of the safety latch entering the opening in the latched position, the knob of the safety latch engaging the movable portion in the latched position.

4. A carrier of claim 3 wherein the safety latch is formed of a resilient material.

* * * * *